(12) United States Patent
Van Der Vlist et al.

(10) Patent No.: US 11,847,472 B2
(45) Date of Patent: *Dec. 19, 2023

(54) FRAMEWORK FOR LINEARIZING INTERVIEWS WHILE PERMITTING USER BACKTRACKING AND PROVISIONALLY STORING ANSWERS FOR REPOPULATING RESPONSES

(71) Applicant: Oracle International Corporation, Redwood Shores, CA (US)

(72) Inventors: Kristy Ann Van Der Vlist, Canberra (AU); Andrew James Barry, Canberra (AU); Stephen Nicholas French, Ainslie (AU); Davin James Fifield, Canberra (AU); Fiona Carolyn Guy, Ainslie (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,223

(22) Filed: Jun. 13, 2022

(65) Prior Publication Data
US 2022/0318034 A1 Oct. 6, 2022

Related U.S. Application Data

(63) Continuation of application No. 17/166,829, filed on Feb. 3, 2021, now Pat. No. 11,429,404.

(51) Int. Cl.
*G06F 9/451* (2018.01)
*G06F 3/04847* (2022.01)
(Continued)

(52) U.S. Cl.
CPC .......... *G06F 9/451* (2018.02); *G06F 3/04847* (2013.01); *G06F 8/38* (2013.01);
(Continued)

(58) Field of Classification Search
CPC ........ G06F 3/04847; G06F 8/38; G06F 9/451; G06F 9/547; H04L 67/142; H04L 67/75
See application file for complete search history.

(56) References Cited

U.S. PATENT DOCUMENTS

| 10,977,746 B1 | 4/2021 | Wang et al. |
| 2002/0035486 A1 | 3/2002 | Huyn et al. |

(Continued)

*Primary Examiner* — Eric J. Bycer
(74) *Attorney, Agent, or Firm* — Invoke

(57) ABSTRACT

Techniques are disclosed for linearizing interfaces within computing applications. In some embodiments, the techniques include defining a sequence of user interface elements, where at least a subset of user interface elements in the sequence of user interface elements correspond to controls for affecting a session state. Responsive to receiving an input value through a user interface element, a linearization process adds the input value to at least one dataset for evaluating a current state for each respective user interface element subsequent to the user interface element in the sequence of user interface elements. The process further evaluates the current state for each respective user interface element subsequent to the user interface element in the sequence of user interface elements based on values within the at least one data set. The process may disable and/or enable one or more user interface elements based on the evaluation.

20 Claims, 12 Drawing Sheets

(51) Int. Cl.
  *G06F 8/38* (2018.01)
  *G06F 9/54* (2006.01)
  *H04L 67/142* (2022.01)
  *H04L 67/75* (2022.01)

(52) U.S. Cl.
  CPC ............ *G06F 9/547* (2013.01); *H04L 67/142* (2013.01); *H04L 67/75* (2022.05)

(56) References Cited

U.S. PATENT DOCUMENTS

| | | |
|---|---|---|
| 2002/0119433 A1 | 8/2002 | Callender |
| 2002/0138462 A1 | 9/2002 | Ricketts |
| 2005/0055321 A1 | 3/2005 | Fratkina et al. |
| 2005/0075919 A1 | 4/2005 | Kim |
| 2006/0265348 A1 | 11/2006 | Weerman |
| 2008/0010351 A1 | 1/2008 | Wardhaugh et al. |
| 2009/0132904 A1 | 5/2009 | Holloway et al. |
| 2010/0281313 A1 | 11/2010 | White et al. |
| 2011/0106731 A1 | 5/2011 | Pearson et al. |
| 2013/0275164 A1 | 10/2013 | Gruber et al. |
| 2014/0067378 A1 | 3/2014 | Anand et al. |
| 2014/0229199 A1 | 8/2014 | Beckley |
| 2014/0330618 A1 | 11/2014 | Wong et al. |
| 2018/0090135 A1 | 3/2018 | Schlesinger et al. |
| 2018/0316630 A1 | 11/2018 | Jacobson |
| 2018/0341870 A1 | 11/2018 | Joshi et al. |
| 2019/0318015 A1 | 10/2019 | Cheesman |
| 2020/0242642 A1 | 7/2020 | Thimsen et al. |
| 2020/0342868 A1 | 10/2020 | Lou et al. |

Screen 1 Screen 2 Summary
Screen 2
Are you employed?
[Yes] [No] — 508

[Back] [Next]

Screen 1 Screen 2 Screen 3 Summary
Screen 2
Are you employed?
[Yes] [No]
Do you have a child under the age of 4? — 512
[Yes] [No]

[Back] [Next]

FIG. 5C

Screen 1 Screen 2 Screen 3 Summary

Screen 3

Do you require child care?

[Yes] [No]

[Back] [Next]

Screen 1 Screen 2 Screen 3 Summary

Summary

Name: Zach

Age: 29

Are you employed?: true

Do you have a child under the age of 4?: true

Do you require childe care?: true

[Back]

Screen 1 Screen 2 Summary ← 600

Screen 2

Are you employed? ← 602

[ Yes ] [ No ]

[ Back ] [ Next ]

FIG. 6A

Screen 1 Screen 2 Summary ← 604

Summary ← 606

Name: Zach

Age: 29

Are you employed?: false

Do you have a child under the age of 4?: <empty>

Do you require childe care?: <empty>

[ Back ]

FRAMEWORK FOR LINEARIZING INTERVIEWS WHILE PERMITTING USER BACKTRACKING AND PROVISIONALLY STORING ANSWERS FOR REPOPULATING RESPONSES

INCORPORATION BY REFERENCE; DISCLAIMER

The following application is hereby incorporated by reference: application Ser. No. 17/166,829 filed on Feb. 3, 2021, issued as U.S. Pat. No. 11,429,404. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to techniques for designing and optimizing computing applications. In particular, the present disclosure relates to a framework for optimizing detection and handling of extraneous input data received through application interfaces.

BACKGROUND

Many software applications include user interfaces that collect data through a set of inputs. Prompts by the software application to collect inputs are sometimes referred to as "questions" and the process of retrieving the inputs is sometimes referred to as an "interview." The software application may use the collected data to perform application-specific computations and/or other computing functions.

Some software applications include conditions on when to present a particular input prompt or question. For example, an application may prompt for marital status if the user is an adult but omit the prompt if the user is a child. Thus, the prompt for marital status may be conditioned on the input value received from another prompt for the user's age. In complex applications with several dependencies between questions and answers, issues may arise when users answer questions out-of-order or backtrack to change an answer. In such circumstances, the effect of changing an input value may render some information previously provided immaterial to the new application path.

If the extraneous information is not identified, then the software application and underlying computing environment may suffer from a number of negative impacts. In particular, the data collection flow of an application may change significantly depending on the input values that were set and the order in which the input values were set. Without proper handling, the software application may not have the minimal set of data required to perform an expected computation or function at the conclusion of the data collection process. Additionally or alternatively, the extraneous data may increase storage costs as the computing system may persist data not required to perform the expected computation or function. In other cases, faulty application logic may prevent a user from changing an answer previously given even though the value may still be influencing the application flow.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3B illustrates an application interface for assigning rules or conditions to a user interface control in a linearized interview in accordance with some embodiments.

FIG. 5B illustrates a second application page of a linearized interview in accordance with some embodiments.

FIG. 5C illustrates an updated application page of a linearized interview in accordance with some embodiments.

FIG. 5D illustrates a fourth application page of a linearized interview in accordance with some embodiments.

FIG. 5E illustrates a summary page for a linearized interview in accordance with some embodiments.

FIG. 6A illustrates an example change to an input value that affects other questions within a linearized interview in accordance with some embodiments.

FIG. 6B illustrates an updated summary page for the linearized interview based on the changed input value in accordance with some embodiments.

FIG. 7C illustrates a different selection of input values through the input screen in accordance with some embodiments.

FIG. 7D illustrates a change in the input screen that hides previously selected input values based on newly provided answers to preceding input controls in accordance with some embodiments.

FIG. 7E illustrates a change in the input screen that restores the previously selected input values based on a change in a previously provided answer in accordance with some embodiments.

DETAILED DESCRIPTION

Figure 1:
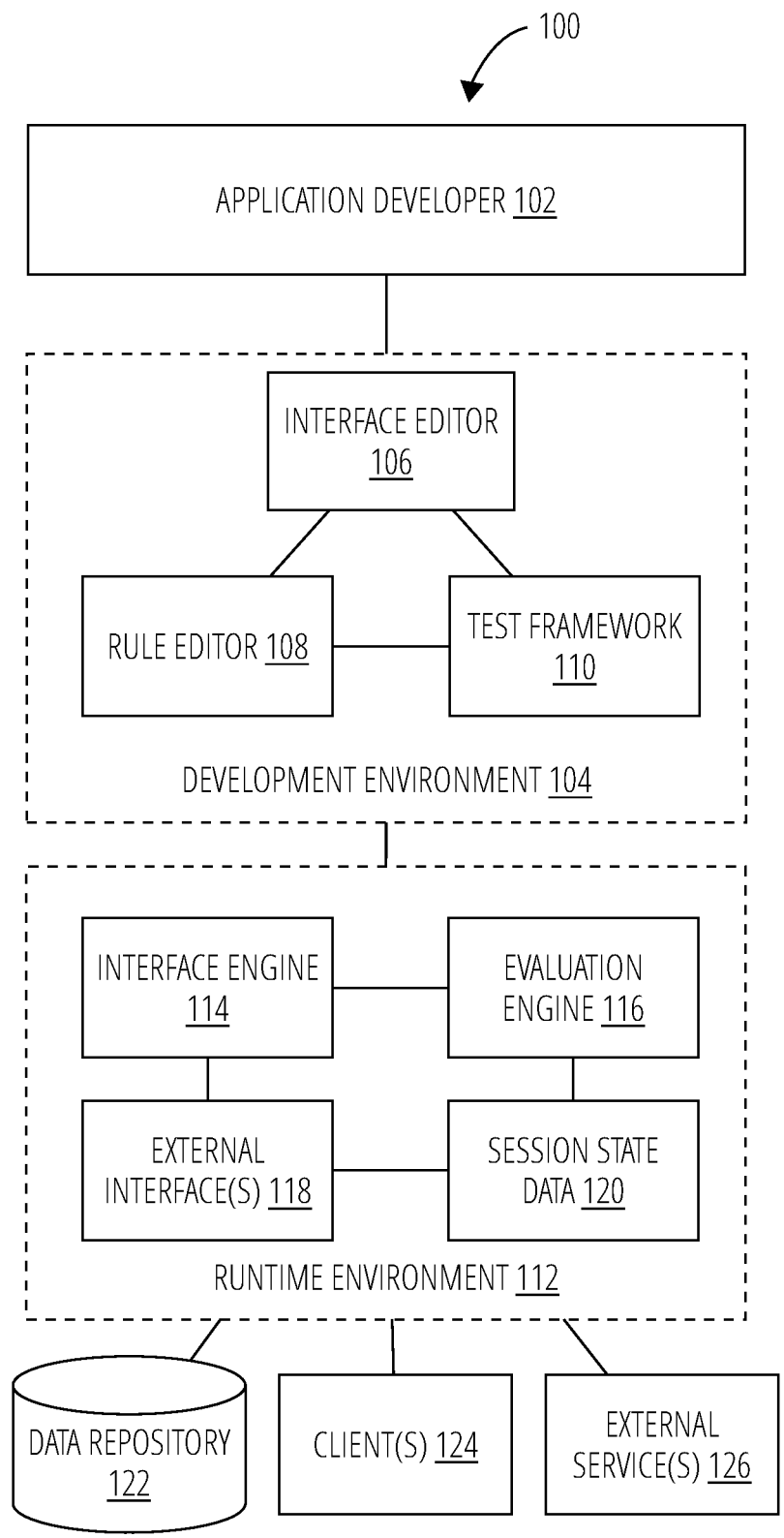
FIG. 1 illustrates a system for designing and deploying user interface applications in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. LINEAR INTERVIEW DESIGN AND DEFINITIONS
4. RUNTIME PROCESSES AND CONSIDERATIONS
5. HANDLING CHANGES BETWEEN APPLICATION PATHS
6. RELEVANCE AND ORDER INDEPENDENCE
7. COMPUTER NETWORKS AND CLOUD NETWORKS
8. HARDWARE OVERVIEW
9. MISCELLANEOUS; EXTENSIONS

1. General Overview

Software-based systems sometimes include goal-directed decision engines or decision support systems (DSS), which process rules comprising logic to define data gathering requirements for a particular application. For example, a rule may define the following logic:

person is eligible for special benefit if {age≥18 and income<benefit income threshold}

Based on the above rule logic, the software application may collect two pieces of information about a person: the person's age and the person's income. The software application may then apply a computation to determine if the person is eligible for the special benefit and what downstream actions to trigger, if any.

When designing the data collection interface, an application developer or other designer may be allowed to define conditions on the data collection experience such as:

The default value of an input parameter;
When a prompt for the input value is visible or not visible; and
Whether an answer to a prompt is required from the user or not.

In some cases, a developer may inadvertently create a combination of conditions that lead to unexpected and undesirable outcomes. The risk may be especially pronounced as the complexity and number of dependencies between different inputs increases. As an example, a developer may define logic to hide the input control for collecting the person's age if the person's income value is set to 0 and to set the person's income to 0 if the person's age is less than 18. In this scenario, if the person's age is entered as 17, then the person's income would default to 0, which would hide the person's age. As a result, the user would have no ability to change the age value, which may have been incorrectly entered.

Techniques described herein help prevent inadvertent errors and unexpected behavior by providing a framework for enforcing consistent data collection flow changes, regardless of what data is provided and in what order the information is received through a user interface. The framework may further ensure that it is always possible to return the data collection flow to a previous state and that states are prevented in which the application fails to obtain the minimal set of input data to properly execute post-interview application-specific functions. The framework may further optimize application storage overhead by eliminating or reducing persistent storage of extraneous information provided during the data collection process.

In some embodiments, the techniques include independently managing the input values the user has submitted during an interview and the input values that are material to determining the state of the interview at a particular point in time. The framework may enforce the separate treatment of datasets by linearizing the data collection flow into a sequence of interface elements. At application runtime, the framework may evaluate the state of an interface element at a particular point in time using only the material data that was collected up to the point of the interface element in the linear sequence of interface elements. Input values collected from interface elements occurring subsequent in the linear sequence may be ignored for purposes of determining the current state of the interface element under evaluation. Thus, input values received through a given user interface element may be prevented from affecting the current state of user interface elements that occur prior to the given user interface element in the sequence.

In some embodiments, the framework maintains a dataset, referred to herein as an answer set, that includes the current set of input values entered by a user, even if one or more of the input values are not material to the current application path. The answer set ensures that no user input is lost when a user switches from an original application path to another path and then back to the original path. For example, a user may initially enter the age as 18 and income as $35,000. These input values may be stored in the answer set. The user may then change the age to 17, causing the income to default to $0 for the new application path. However, the $35,000 may remain in the answer set even though it is no longer material to the current interview state. If the user changes the age value again to 18 or older, then the answer set may be used to restore the $35,000 value, which may also have downstream effects on other user interface elements in the linear sequence. At the conclusion of the data collection process, the answer set may be discarded to optimize application storage overhead since the user set may include immaterial input values.

One or more embodiments described in this Specification and/or recited in the claims may not be included in this General Overview section.

2. System Architecture

FIG. 1 illustrates system 100 for designing and deploying user interface applications in accordance with some embodiments. In other embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, system 100 includes or corresponds to a framework comprising development environment 104 and runtime environment 112. Development environment 104 may include a set of one or more applications for authoring, testing, and deploying linearized interview definitions and interfaces. Application developer 102 may interact with development environment 104 via a user interface, such as a web interface or local application interface.

In some embodiments, development environment 104 includes interface editor 106, rule editor 108, and test framework 110. Interface editor 106 may be a software application or tool through which application developer 102 may generate and design user interface elements that adhere to a linearized interview format. In some embodiments, interface editor includes an interface for facilitating the defining of a linear sequence of user interface elements. For example, application developer 102 may define a sequence of one or more pages and one or more interface controls. A page in this context may be a webpage, a desktop or mobile application page, or a sub-region therein that includes one or more interface control. An interface control may correspond to a user interface element through which a user may provide one or more input values when the interface control is enabled. Application developer 102 may define how many pages are in the data collection process, how many interface controls are associated with each page, and what values are collected by each interface control.

In some embodiments, interface editor 106 allows application developer 102 to choose, change, and/or otherwise select the look, feel, and format of the user interface elements. For example, interface editor 106 may allow application developer 102 may select the theme, color, and/or other design elements for each user interface elements. Additionally or alternatively, interface editor 106 may select what text to display for each user interface element and/or the type of user interface element to use at each stage of the linear sequence. Examples of user interface elements include checkboxes, radio buttons, dropdown lists, list boxes, buttons, toggles, text fields, date and time selectors, command lines, sliders, pages, and forms.

In some embodiments, interface editor 106 allows application developer 102 to associate rules and conditions with user interface elements. For example, application developer 102 may define conditions under which a user interface controls are enabled and disabled. As another example, application developer 102 may define conditions under which an input value is required for a computation or optional. Additionally or alternatively, application developer 102 may define computations or other computing functions to perform using a set of input variables.

In some embodiments, application developer 102 may define the rules using rule editor 108. A rule may conform to one or more programming languages, such as a scripting language, to define conditions associated with an individual user interface element or group of user interface elements. A rule may control the state of a user interface element during runtime. For example, a rule may define the conditions under which a user interface element is enabled, disabled, required, or optional. One or more conditions of a rule may be defined as a function of input values from entered through user interface elements occurring previously in the linear sequence.

In some embodiments, test framework 110 includes logic for running a linear interview in a test environment, which may mirror or simulate a production environment. Additionally or alternatively, test framework 110 may include logic for validating and/or debugging linear interview definitions and interface designs. For example, test framework 110 may detect if there are any errors within the rules that would violate the linearity of the flow. An error may occur if a rule conditions the enablement of a user interface control on an input value collected from another user interface control occurring subsequent in the linear sequence of user interface elements. In this case, test framework 110 may present an error or warning message to application developer 102. Additionally or alternatively, test framework 110 may check rules for syntactic and/or semantic errors and notify application developer 102 if any are detected.

In some embodiments, runtime environment 112 includes application and/or tools for executing linear interviews based on the provided designs and definitions. Runtime environment 112 may generally comprise interface engine 114, evaluation engine 116, external interface(s) 118, and session state data 120.

In some embodiments, interface engine 114 provides a user interface to interact with client(s) 124. Interface engine 114 may render user interface elements based on the provided designs and definitions to prompt a user for input data. For example, interface engine 114 may render a page within a website, mobile application, or desktop application that conforms with the design defined by application developer 102 through development environment 104. To prompt the user for input data, interface engine 114 may further render, within the page, various user interface controls, including checkboxes, radio buttons, dropdown lists, list boxes, buttons, toggles, text fields, date and time selectors, command lines, sliders, pages, and forms. Interface engine 114 may capture input data entered by a user and pass the data to evaluation engine 116.

In some embodiments, evaluation engine 116 includes a rule engine that evaluates rules defined within a linear interface definition based on session state data 120. For example, evaluation engine 116 may determine which controls should be enabled and/or disabled based on the current set of answers provided by a user. Evaluation engine 116 may pass the evaluation results to interface engine 114. In response, interface engine 114 may determine how to render the user interface that is presented to the end user.

External interface(s) 118 may link runtime environment 112 to one or more external service(s) 126. An external service may be invoked to load input data and/or extend application functionality. For example, the application may be a shopping cart application that prompts users for cart items, shipping, information, and payment information. Upon entering a shipping address, the application may invoke an external service to determine sales tax, if any, associated with the location. As another example, at the conclusion of an interview, an external service may be invoked to perform one or more downstream functions, such as invoking functions of supply chain management software or reconfiguring computing resources (hardware and/or software). Examples of external service(s) 126 may include external software application, executing on the same or different host machine, cloud services, such as software-as-a-service (SaaS) applications and platform-as-a-service (PaaS) instances, and/or other web-based applications.

Session state data 120 includes data defining the current state of an interview. In some embodiments, session state data 120 includes an answer dataset and a calculation dataset. An answer dataset may include the current set of input values provided by a user, even if some of the values are not material to the current session state and were entered through controls that have subsequently been hidden/disabled. A calculation dataset may include the set of data used to evaluate the state of a given control. Stated another way, the calculation dataset may include the set of non-extraneous information at a particular point during the interview. A calculation dataset may include all the values in the answer set or a subset thereof. Additionally or alternatively, the calculation dataset may be managed independently from the answer set during runtime. At the conclusion of the interview, runtime environment 112 may refrain from persistently storing the non-extraneous information to reduce storage costs.

At the conclusion of an interview, runtime environment 112 may commit data to data repository 122. In some embodiments, data repository 122 is any type of storage unit and/or device (e.g., a file system, database, collection of tables, or any other storage mechanism) for storing data. Further, data repository 122 may include multiple different storage units and/or devices. The multiple different storage units and/or devices may or may not be of the same type or located at the same physical site. Further, data repository 122 may be implemented or may execute on the same computing system as one or more other components of system 100. In other embodiments, data repository 122 may be implemented or executed on a remote network host. Data repository 122 may be communicatively coupled to runtime environment 112 via a direct connection or via a network.

Client(s) 124 may include human users, applications and/or services that interact with runtime environment 112 to provide input data responsive to prompts. Client(s) 124 may provide the input via one or more interfaces. Examples of interfaces include a graphical user interface (GUI), a command line interface (CLI), a haptic interface, and a voice command interface.

In some embodiments, different components of the interfaces described herein are specified in different languages. The behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Additionally or alternatively, the interfaces described herein may be specified in one or more other languages, such as Java®, C, or C++.

In some embodiments, one or more components of system 100 are implemented as a cloud service, such as a SaaS. Additional embodiments and/or examples relating to computer networks are described below in Section 7, titled "Computer Networks and Cloud Networks."

In some embodiments, the components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Linearized Interview Design and Definitions

As previously indicated, development environment 104 provides an authoring application through which application developer 102 may create interview interfaces and/or definitions. In some embodiments, the authoring process includes designing a set of user interface elements, defining a linear sequence for the user interface elements, and assigning rules/conditions to the set of user interface elements. Once created, the linear interview definition may be stored in one or more files, which may comprise code that is executable by runtime environment 112.

Figure 2:
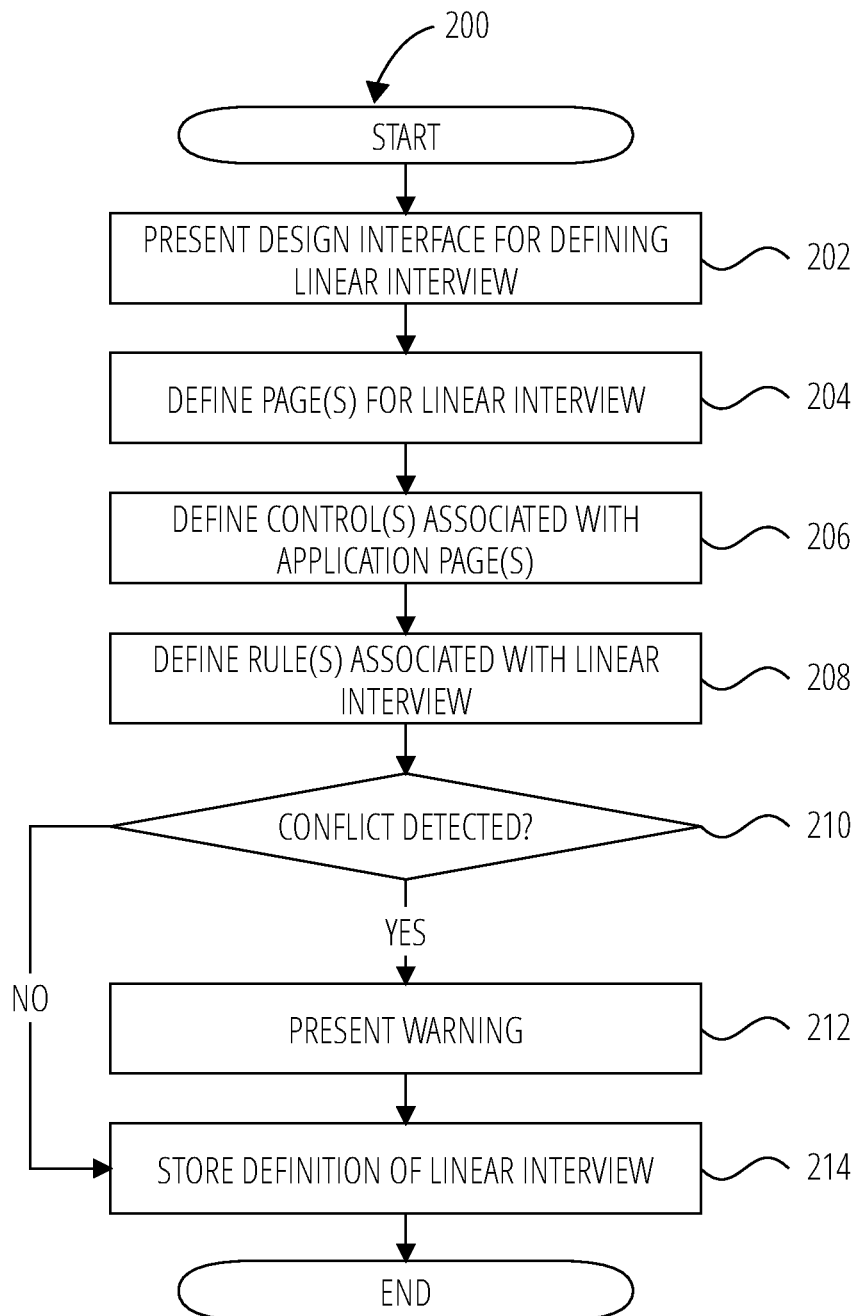
FIG. 2 illustrates a process for generating an interview definition in accordance with some embodiments.

FIG. 2 illustrates process 200 for generating an interview definition in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

In some embodiments, process 200 presents a design interface for defining a linear interview (operation 202). The design interface may include a user interface, such as a GUI, to facilitate the design process for the designer.

In some embodiments, process 200 receives input to define one or more pages for the linear interview (operation 204). As previously mentioned, a page may correspond to a webpage, application page in a mobile application, application page in a desktop application, or a sub-region thereof. An authoring application may allow a user to configure various display parameters associated with the pages, such as the size, theme, background patterns or colors, text, text position, font, and/or other visual aspects and content included in the page.

In some embodiments, process 200 receives input to define controls associated with application pages (operation 206). An application page may be associated with zero or more user interface control. A user interface control may include any user interface element for receiving user input, which may affect the state of the interview or current application path. A user interface control may correspond to a prompt or "question" that identifies what input is requested from the user. The designer may select the type of user interface control. As previously mentioned, examples include checkboxes, radio buttons, dropdown lists, list boxes, buttons, toggles, text fields, date and time selectors, command lines, sliders, pages, and forms. The user may further configure the look and feel of the user interface elements, such as the size, shape, color, and/or other visual aspects. Additionally or alternatively, the user may define text and/or graphics to display within or adjacent to the user interface control. The text and/or graphic may convey information about what input data is requested.

In some embodiments, the set of one or more pages and one or more user interface controls form a linear sequence of user interface elements. The design application may infer the order of user interface elements based on the order in which they are created or positioned in the authoring application. For example, the first page may correspond to the first user interface element in the sequence, the first interface control on the page may correspond to the second user interface element in the sequence, and so forth. In other cases, the user may be prompted to explicitly identify the order. The user may change the order of the user interface elements during the design process.

In some embodiments, process 200 receives input to define rules associated with the linear interview (operation 208). A rule may define conditions associated with one or more user interface controls. For example, a rule associated with a user interface control may specify that the user interface control is disabled unless the person's age is greater than 17. The person's age in this example may be an input parameter received through a preceding interface control.

In some embodiments, a rule may specify how the user interface control is disabled. For example, the rule may specify that when disabled, the user interface element is hidden such that it is not visible or accessible to a user via a graphical user interface. As another example, the rule may specify that when disabled, the user interface element is switched to a read-only state such that the control is visible but new input values are prevented from being submitted by a user through the control. The linearity of the user interface elements may help ensure that a user interface control for material input parameters are not hidden when the user inputs values out-of-order or switches input values.

In some embodiments, a rule may specify logic for performing application-specific computations based on a set of one or more input values. For example, a rule may be defined to specify whether a user is eligible for a benefit based on a set of answers submitted by the user. As another example, a rule may be defined to provision and configure a cloud service based on parameters submitted by the user. Additionally or alternatively, rules may define other application-specific functions to execute based on the provided input.

In some embodiments, the sequence of user interface elements and associated rules define a set of application paths. Different application paths may correspond to different flows of user interface elements and/or different treatment of input data. For example, if a user enters a particular value via a user interface element, the user may be guided down a particular application path where only a certain set of user interface elements are visible/enabled. On a different application path, a different combination of user interface elements may be enabled and disabled. Additionally or alternatively, the set of extraneous information may vary between the application paths. In the case of a branching interview, a user may initially follow a first path and then backtrack to change an answer putting them on a different application path. The data entered on the original path which is not on the new path may now be classified as extraneous. Stated another way, user-supplied information that cannot be edited may be prevented from influencing the current session state.

In some embodiments, process 200 checks for conflicts within the defined rules (operation 210). A conflict may arise if the rules do not conform to the linearity of the defined sequence of elements. In the example where a developer defines logic to hide the input control for collecting the person's age if the person's income value is set to 0 and to set the person's income to 0 if the person's age is less than 18, a violation may be detected because one of the input values occurs subsequently to the other in the linear sequence. If a rule places a condition on a user interface control based on the input value of a subsequent user interface control, then process 200 may classify the rule as having a conflict.

If a conflict is detected, process 200 may present a warning to the user (operation 212). The warning message may identify each rule associated with the conflict and the reason for the conflict. Additionally or alternatively, the message may include recommendations for resolving the conflict, such as removing dependencies on values from subsequent user interface controls or reordering the sequence of user interface controls. The user may then edit the rules and/or ordering. In other cases, the user may leave the rule as is if the condition is acceptable for the application.

In some embodiments, process 200 further stores the definition of the linear interview (operation 214). The definition file may include code for rendering the defined user interface items and implementing the defined rules. The definition may be deployed in a runtime environment, such as a production or test environment. Additionally or alternatively, the definition may be shared with other users, which may incorporate the interview definition with other applications.

Figure 3A:
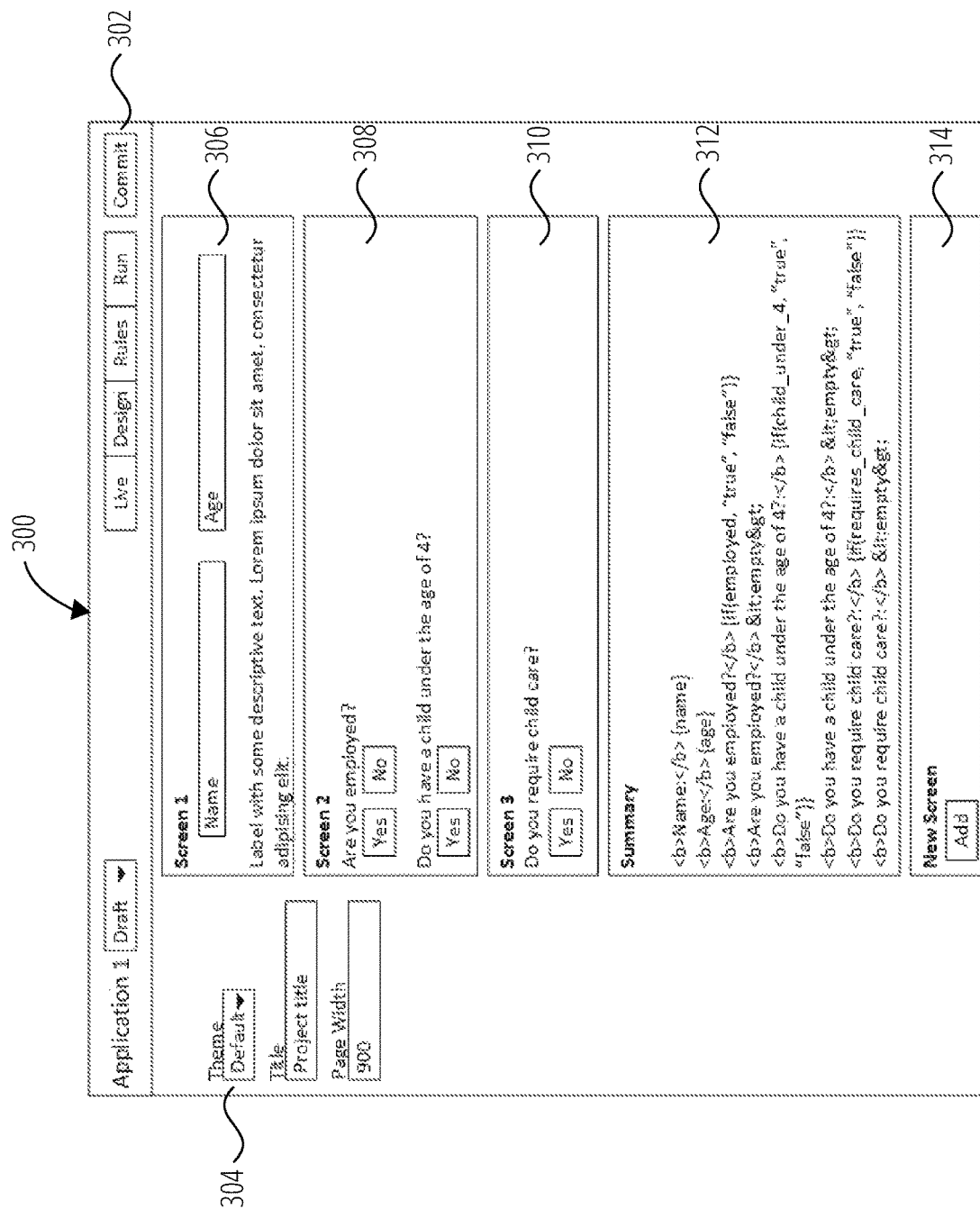
FIG. 3A illustrates an application interface for designing a set of user interface elements for a linearized interview in accordance with some embodiments.

FIG. 3A illustrates application interface 300 for designing a set of user interface elements for a linearized interview in accordance with some embodiments. Application interface 300 include navigation pane 302, which allows the designer to switch between different application drafts/designs. Navigation pane 302 further allows the user to change between the design of the user interface elements, the rules, testing, and running the application. The user may select the commit button in navigation pane 302 to save the current design.

Panel 304 allows the user to specify various design parameters, including a theme, title, and page width. In the illustrated example, the designer has defined four pages, which are also referred to as screens: page 306, page 308, page 310, and page 312. The designer has further defined user interface controls for page 306, page 308, and page 310. For example, page 306 includes two text fields to prompt a user for their name and age. Page 308 includes two controls prompting for the user's employment status and the age of their children. Page 310 includes a single control asking if the user requires childcare. Page 312 defines code for presenting a summary of the input values provided by the user. The designer may add a new page by selecting the "Add" button from user interface element 314.

Figure 3B:
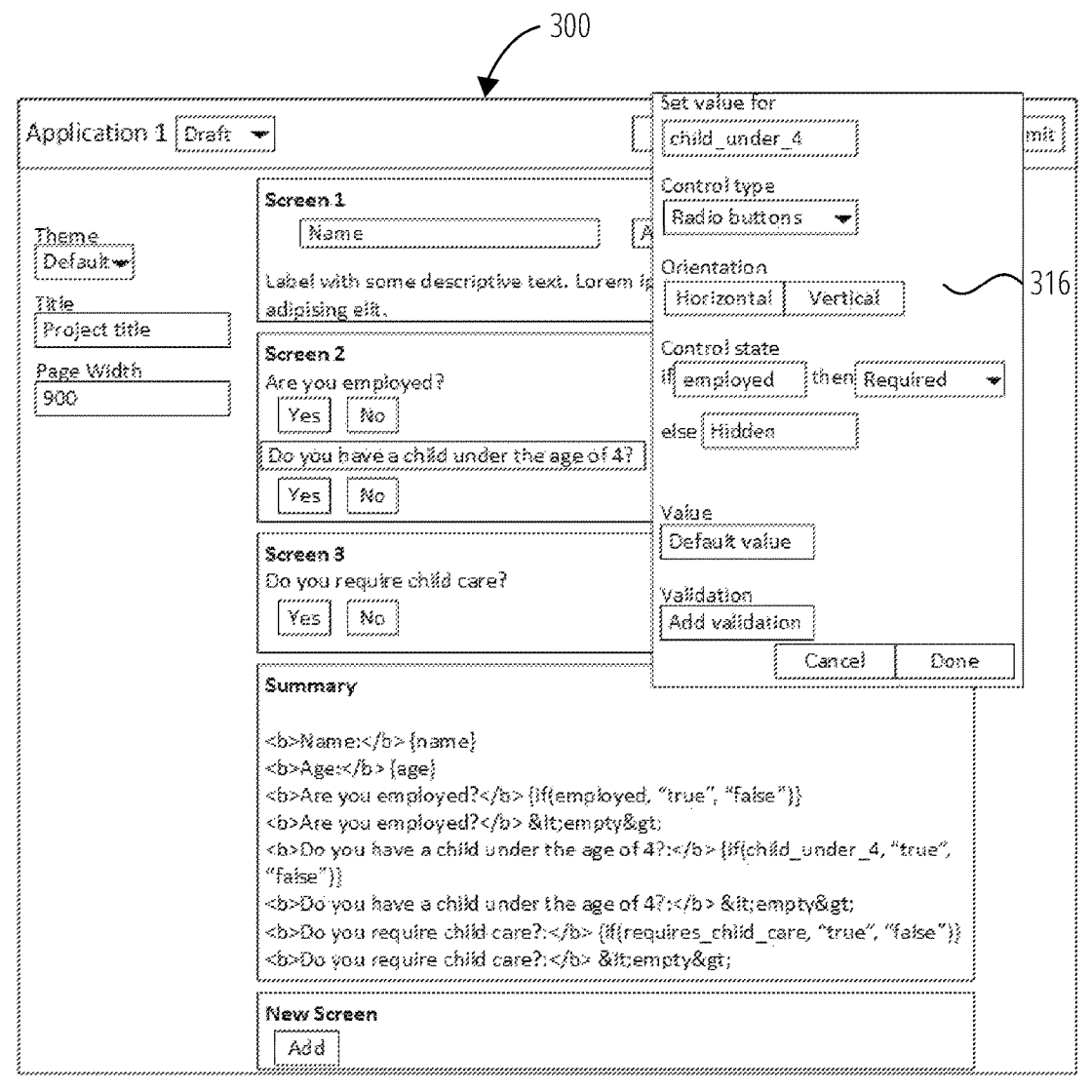

FIG. 3B illustrates that a user may assign rules or conditions, through application interface 300, to a user interface control in a linearized interview in accordance with some embodiments. In the illustrated example, the designer has selected the user interface control prompting the user to specify whether they have a child under the age of 4. In response, window 316 is displayed, which allows the designer to define various parameters and conditions for the control. For example, the designer may define a variable name for storing the input value (Boolean child_under_4), the control type (radio buttons, checkboxes, etc.) the orientation of the control design (horizontal or vertical), the control state (the conditions under which a control is visible, required, read-only, optional, or hidden), a default value if an input has not been provided, and validation logic to verify a provided answer. In the present example, the designer has specified a rule governing the control state such that if the employed is true, then the control for collecting the child_under_4 value is required and visible. If employed is false or has not been received, then the user interface element is hidden and inaccessible to the user. The designer may similarly edit the parameters and control state rules for the other user interface elements displayed by application interface 300.

4. Runtime Processes and Considerations

In some embodiments, runtime environment 112 is configured to load interview definitions and execute the data collection process for an application based on the interview definitions. To execute the data collection process runtime environment 112 may determine the control state for each user interface element in the sequence of user interface elements defined in the definition. Based in part on the control state of each user interface element, runtime environment 112 may determine which user interface elements to render and how they should be rendered. For example, a visible user interface element may be presented in an editable format or a read-only format. A hidden user interface element is not displayed or otherwise made accessible to the user via the application interface.

Figure 4:
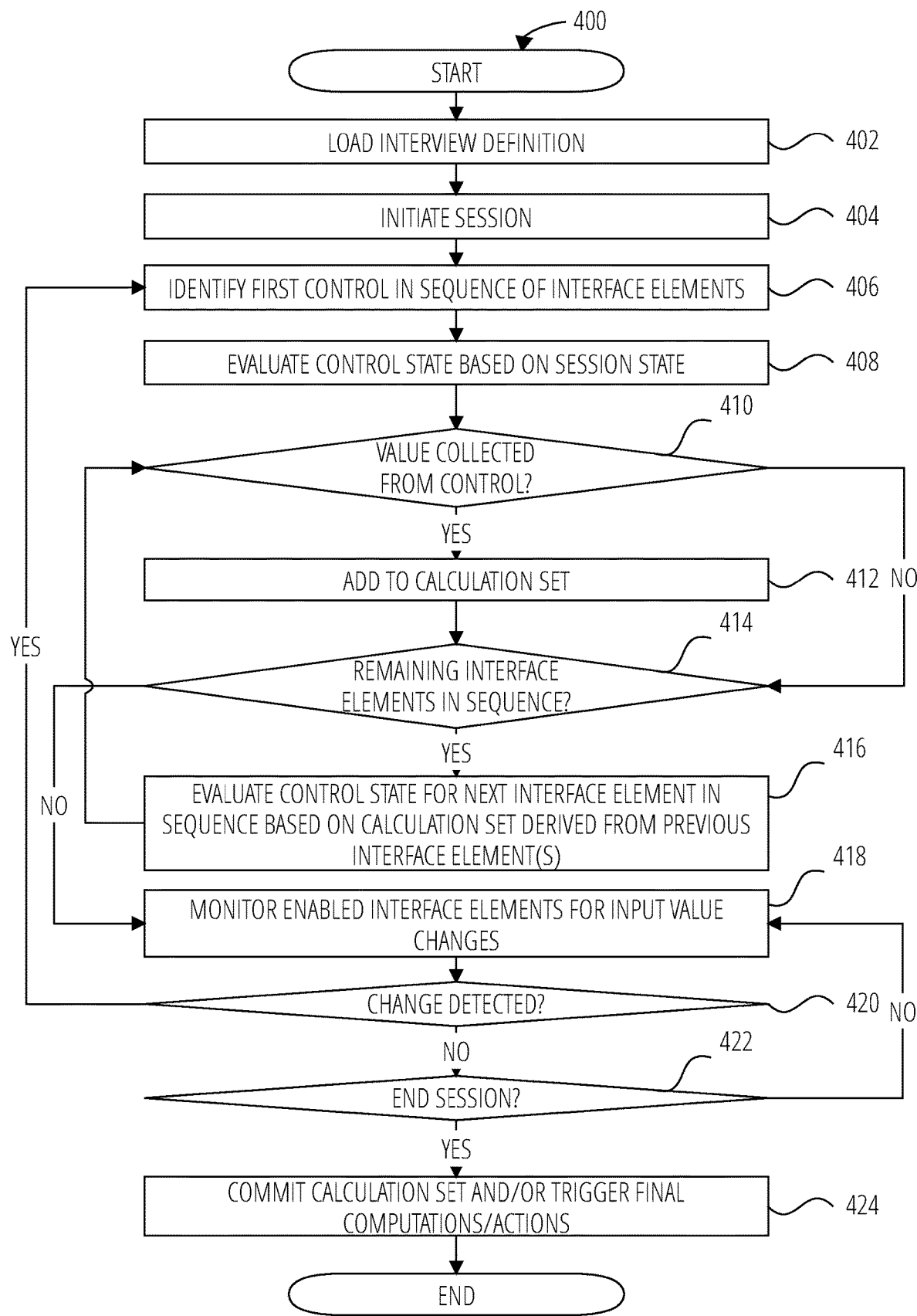
FIG. 4 illustrates a process for executing a linearized interview during application runtime in accordance with some embodiments.

FIG. 4 illustrates a process for executing a linearized interview during application runtime in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, process 400 loads an interview definition (operation 402). As previously mentioned, the interview definition may comprise code, such as scripts or object code that are executable by runtime environment 112.

Process 400 further initiates a session for the interview (operation 404). In some embodiments, when the session initiates, process 400 determines whether any default values are defined in the interview definition. If a default value is not defined for an input value, then it may be set to a null or empty value.

In some embodiments, process 400 may load a set of input values from an external source when initiating a new session. For example input data may be imported from another service or application. Process 400 may then determine the initial control states of the user interface elements based on the loaded values. Process 400 may further identify and filter out extraneous information based on the loaded interview definition.

Once a session has been initiated, process 400 identifies the first control in the sequence of interface elements determined from the loaded interview definition (operation 406). For instance, in the interview definition depicted in FIG. 3A, the first user interface element is Screen 1, and the first user interface control is the "Name" field.

Process 400 next evaluates the control state for the first control based on the current session state (operation 408). When first initiated, the current session state may be determined based on the loaded input values, default values, and/or rules, if any, specified for the first control. Generally, the first control may be visible when the session is first initiated. If a default value is specified, then the first control may be rendered within the display region to present the default value to the user. For example, if a default name is specified, then the "Name" field may be populated with the value. Otherwise, it may be left empty.

In some embodiments, process 400 determines whether a value has been collected from the first control (operation 410). If a value has been entered by a user or loaded from another source, then the value may be assigned to a corresponding variable. Process 400 may verify that the entered value conforms to expected parameters before the value is accepted. For example, process 400 may verify that a positive numeric value is entered in an "income" field. The parameters may vary based on what type of information the user is being prompted for by the application. If the entered value does not conform, then process 400 may present an error message to the user indicating why the value was rejected and/or prompt the user to enter another value.

If a value is collected from the control, process 400 adds the value to a calculation set (operation 412). As previously indicated, a calculation dataset maintains the set of data used to evaluate the state of a given control or other user interface element. In this instance, the value is added to the calculation set to evaluate the next user interface element in the sequence of user interface elements if any remain.

After the value has been added to the calculation set or if no value has been received through the control, then process 400 determines whether there are any remaining interface elements in the sequence of user interface elements specified in the interface definition (operation 414).

If a user interface element remains, then process 400 evaluates the control state for the next element in the sequence based on the calculation set derived from the previous interface elements (operation 416). In some embodiments, the calculation set does not include any values entered subsequent to the user interface element under evaluation. Process 400 may evaluate the user interface elements in the defined sequence to prevent controls subsequent in the sequence from affecting the control state of previous user interface elements, thereby linearizing the interview process.

In some embodiments, evaluating the control state includes assigning or otherwise associating the user interface element with a classifier that indicates how the user interface element should be rendered. Example classifiers include visible, editable, read-only, hidden, required, and optional. Interface engine 114 may determine how to render the user interface based on the classifiers assigned to the user interface elements.

Once all the interface elements have been evaluated, process 400 monitors the enabled interface elements for input value changes (operation 418). A change in this context may be the first value input by the user for the control, a change to a previous value input by the user or data loaded from an external system or process.

If a change is detected, then process 400 returns to operation 406 to reevaluate the control state of the sequence of user interface elements (operation 420). Process 400 may clear the values from the calculated set before reevaluation begins.

In some embodiments, process 400 determines whether to end the session or continue monitoring for input changes (operation 422). The session may be ended in response to an explicit request from the user or if the user has answered all questions in the current application path.

Once the session is ended, process 400 commits the input values included in the calculation set and/or triggers final computations/actions (operation 424). Input values that are not included in the calculation set may be discarded to refrain from persistently storing these values, thereby reducing application storage costs. The final computations and downstream actions may vary depending on the particular application. For example, an application may determine whether the user is eligible for a grant or loan. As another example, the user may be a new subscriber to a cloud service, and the application may determine how to provision a set of cloud resources based on the input provided by the user. For instance, process 400 may select the location of the cloud resources, entitlement allocations, operating system version, and/or other resource configurations to optimize the service for the user. Additionally or alternatively, other actions may be triggered based on the material set of information included in the calculation set.

Figure 5A:
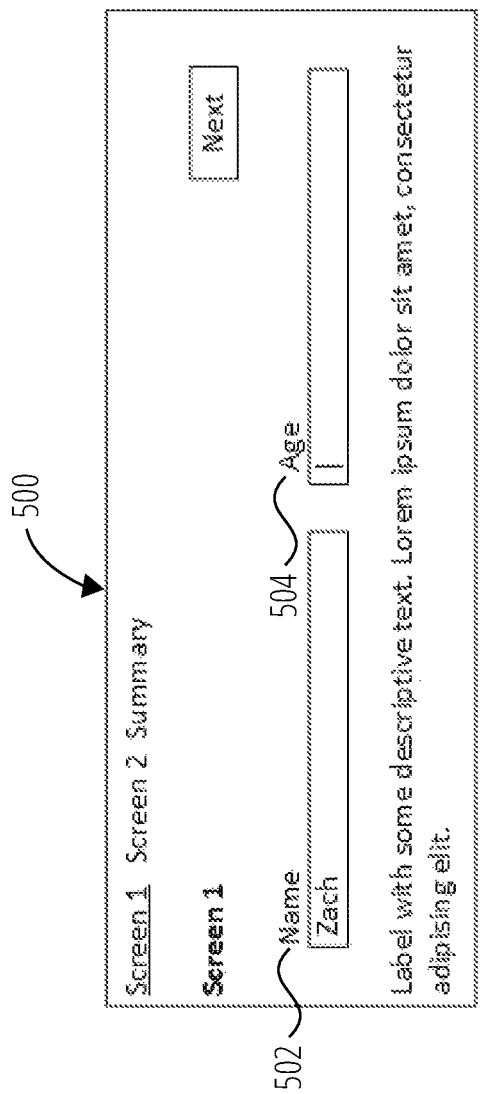
FIG. 5A illustrates a first application page of a linearized interview in accordance with some embodiments.

FIGS. 5A-E provide an example of the linearized interview process applied to the interview definition depicted in FIGS. 3A-B. FIG. 5A illustrates a first application page of the linearized interview in accordance with some embodiments. Application page 500 may be initially presented to the user. Application page 500 includes name control 500 and age control 504, prompting the user to input their name and age. Both controls start in a visible and editable control state.

FIG. 5B illustrates a second application page of a linearized interview in accordance with some embodiments. Application page 506 is presented responsive to the user selecting "Next" from application page 500. Application page 506 presents only interface control 508 to the user prompting for the user's employment status. As illustrated in FIG. 3B, the definition defines two interface controls. However, the conditions defined in window 316 hides the second control unless employment is set to true. Similarly, screen 3 has a rule that causes it to be hidden and disabled unless employed is set to true.

FIG. 5C illustrates an updated application page of a linearized interview in accordance with some embodiments. When the user confirms their employed status, application page 506 is updated to display item 510 and interface control 512 become visible. Item 510 is text or a link indicating that screen 3 has become accessible to the user responsive to the employment status being set to true. The user may provide an answer to the second prompt through interface control 512 and/or navigate to screen 3 by selecting the "next" button.

FIG. 5D illustrates a third application page of a linearized interview in accordance with some embodiments. Application page 514 includes interface control 516 to prompt the user for input specifying whether childcare is required.

FIG. 5E illustrates a summary page for a linearized interview in accordance with some embodiments. Summary page 518 presents summary 520, which displays the current input values that have been entered by the user. The user may select the "back" button to return to previous application pages and edit their answers.

For the above screen flow, the resulting linear sequence may be represented as:

1. Screen 1
2. Name
3. Age
4. Label
5. Screen 2
6. Are you employed?
7. Do you have a child under the age of 4?
8. Screen 3
9. Do you require childcare?

If the user traverses through the interview in a linear fashion, the process depicted in FIG. 4 may be applied as follows:

TABLE 1

Example application of linearization process where user inputs values in order

| | User Enters Value . . . | Answer set | Item State | Calculation Set |
|---|---|---|---|---|
| 0 | <initial state> | <empty> | Screen 1: Visible | <empty> |
| | | | Name: Visible | <empty> |
| | | | Age: Visible | <empty> |
| | | | Label: Visible | <empty> |
| | | | Screen 2: Visible | <empty> |
| | | | Are you employed?: | <empty> |
| | | | Do you have a child under the age of 4?: Hidden | <empty> |
| | | | Screen 3: Hidden | <empty> |
| | | | Do you require child care?: Hidden | <empty> |
| 1 | Name: Zach | Name: Zach | Screen 1: Visible | <empty> |
| | | | Name: Visible | <empty > |
| | | | Age: Visible | Name: Zach |
| | | | Label: Visible | Name: Zach |
| | | | Screen 2: Visible | Name: Zach |
| | | | Are you employed?: | Name: Zach |
| | | | Do you have a child under the age of 4?: Hidden | Name: Zach |
| | | | Screen 3: Hidden | Name: Zach |
| | | | Do you require child care?: Hidden | Name: Zach |
| 2 | Age: 29 | Name: Zach Age: 29 | Screen 1: Visible | <empty> |
| | | | Name: Visible | <empty> |
| | | | Age: Visible | Name: Zach |
| | | | Label: Visible | Name: Zach Age: 29 |
| | | | Screen 2: Visible | Name: Zach Age: 29 |
| | | | Are you employed?: Visible | Name: Zach Age: 29 |
| | | | Do you have a child under the age of 4?: Hidden | Name: Zach Age: 29 |
| | | | Screen: Hidden | Name: Zach Age: 29 |
| | | | Do you require child care?: Hidden | Name: Zach Age: 29 |
| 3 | Are you employed?: True | Name: Zach Age: 29 Are you employed?: True | Screen 1: Visible | <empty > |
| | | | Name: Visible | <empty> |
| | | | Age: Visible | Name: Zach |
| | | | Label: Visible | Name: Zach Age: 29 |
| | | | Screen 2: Visible | Name: Zach Age: 29 |
| | | | Are you employed?: Visible | Name: Zach Age: 29 |
| | | | Do you have a child under the age of 4?: Visible | Name: Zach Age: 29 Are you employed?: |
| | | | Screen: Hidden | Name: Zach Age: 29 Are you employed?: |

TABLE 1-continued

Example application of linearization process where user inputs values in order

| User Enters Value... | Answer set | Item State | Calculation Set |
|---|---|---|---|
| | | Do you require child care?: Hidden | Name: Zach<br>Age: 29<br>Are you employed?: |
| 4 Do you have a child under the age of 4?: True | Name: Zach<br>Age: 29<br>Are you employed?: True Do you have a child under the age of 4?: True | Screen 1: Visible<br>Name: Visible<br>Age: Visible<br>Label: Visible<br><br>Screen 2: Visible<br><br>Are you employed?: Visible<br>Do you have a child under the age of 4?: Visible<br><br>Screen: Visible<br><br><br><br>Do you require child care?: Visible | <empty><br><empty><br>Name: Zach<br>Name: Zach<br>Age: 29<br>Name: Zach<br>Age: 29<br>Name: Zach<br>Age: 29<br>Are you employed?:<br>Name: Zach<br>Age: 29<br>Name: Zach<br>Age: 29<br>Are you employed?:<br>Name: Zach<br>Age: 29<br>Are you employed?:<br>True Do you have a child under the age of<br>Name: Zach<br>Age: 29<br>Are you employed?:<br>True Do you have a child under the age of |
| 5 Do you require child care?: True | Name: Zach<br>Age: 29<br>Are you employed?: True Do you have a child under the age of 4?: True Do you require child care ?: True | Screen 1: Visible<br>Name: Visible<br>Age: Visible<br>Label: Visible<br><br>Screen 2: Visible<br><br>Are you employed?: Visible<br>Do you have a child under the age of 4?: Visible<br><br>Screen: Visible<br><br><br><br>Do you require child care?: Visible | <empty><br><empty><br>Name: Zach<br>Name: Zach<br>Age: 29<br>Name: Zach<br>Age: 29<br>Name: Zach<br>Age: 29<br>Name: Zach<br>Age: 29<br>Are you employed?:<br>Name: Zach<br>Age: 29<br>Are you employed?:<br>True Do you have a child under the age of<br>Name: Zach<br>Age: 29<br>Are you employed?:<br>True Do you have a child under the age of |
| Material information: | | Name: Zach<br>Age: 29<br>Are you employed?: True<br>Do you have a child under the age of 4?:<br>True Do you require child care?: True | |

As illustrated in Table 1, the calculation set for a user interface item may depend on its position within the linear sequence and the current set of input values provided by the user. In the above example, the answer set is the same as the material set of data since the user entered the information in sequence and all information is editable on the screen.

5. Handling Changes Between Application Paths

In some embodiments, a user may change application paths by backtracking and changing input values. A change in one input value may cause the materiality of one or more other values to change. As a result, the answer set and the calculation set may diverge since the answer set may store values that are not material to the current application path.

FIG. 6A illustrates an example change to an input value that affects other questions within a linearized interview in accordance with some embodiments. In the illustrated example, the user navigates back to application page 600 and changes the answer previously submitted via interface control 602 from "Yes" to "No". In response, the subsequent user interface elements including the user interface elements corresponding to "Do you have a child under the age of 4?", "Screen 3", and "Do you require child care?" are disabled and hidden. In other embodiments, other user interface controls may become enabled and visible based on the changed response. For example a prompt requesting whether the user is currently receiving unemployment benefits may be presented for the new application path.

FIG. 6B illustrates updated summary page 604 for the linearized interview based on the changed input value in accordance with some embodiments. Summary page 604 presents summary 606 for the new path, indicating that the values for "Do you have a child under the age of 4" and "Do you require child care?" are now empty. Even though these values are set to null within the calculated set, the answer set may store the previously entered input values for these parameters.

If the user changes the answer as illustrated in FIG. 6A, the state of the interview depicted in Table 1 would be recalculated as follows:

TABLE 2

Example application of linearization process where user inputs changes input value

| User Enters Value . . . | Answer set | Item State | Calculation Set |
|---|---|---|---|
| Are you employed?: False | Name: Zach Age: 29 Are you employed?: False Do you have a child under the age of 4?: True Do you require child care?: True | Screen 1: Visible Name: Visible Age: Visible Label: Visible Screen 2: Visible Are you employed?: Do you have a child under the age of 4?: Hidden Screen: Hidden Do you require child care?: Hidden | <empty> <empty> Name: Zach Name: Zach Age: 29 Name: Zach Age: 29 Name: Zach Age: 29 Are you employed?: False Name: Zach Age: 29 Are you employed?: False Name: Zach Age: 29 Are you employed?: False |
| Material information: | | Name: Zach Age: 29 Are you employed?: False | |

As illustrated in Table 2, there is a distinct difference between the answer set and the set of material data. Answering "Are you employed?" as false has the effect of hiding the question "Do you have a child under the age of 4?", which rules its answer extraneous. That, in turn, causes Screen 3 to be hidden and renders the question "Do you require childcare?" extraneous. Thus, the answers to "Do you have a child under the age of 4?" and "Do you require childcare?" are removed from the final data set for the interview. If the interview session ends, then these values are not committed to the database since they are not a part of the material set. Thus, the answer set may store values that do not affect the current session state or the current state of the set of user interface elements. Further, computations or functions performed at the conclusion of the interview may restricted to using only values in the material dataset. Stated another way, values stored in the answer set that are not included in the material set do not affect the final computations or functions triggered once the interview is complete. For example, a true value for "Do you require childcare" in the answer set may not be incorporated into an automated eligibility calculation since the value diverges from the material dataset.

If the user switches back to the previous path, such as by selecting "Yes" to the "Are you employed?" question, then the values within the answer set may be extracted and used to repopulate the calculated set. When the user interface elements become visible again, interface engine 114 may render the elements such that the previously selected values are displayed. Thus, the user is not required to reenter the input values, which may be especially time-consuming and burdensome.

In some cases, the restored values may affect the control state of other downstream user interface elements. As an example, by changing the value back to true for "Are you employed?", the value for "Do you have a child under the age of 4?" may be restored to true, which may change the control state of one or more other user interface elements in the sequence. For instance, previously enabled user interface elements may be disabled and/or previously disabled user interface elements may be enabled.

6. Relevance and Order Independence

In some embodiments, the techniques described above may be integrated with a backward chaining rules engine. Backwards chaining may start with an attribute that is specified as the goal attribute. The rule engine may then query for attributes that influence the goal attribute based on a set of rules through an inference process and report any influencing attributes that are not known. Thus, the rule engine may determine what is needed to determine the goal attribute. The rule engine may then scan a rule decision tree in reverse direction, drawing conclusions based on which attributes have values. Once the goal attribute is determined, the rule engine may report the value and how it reached the determination.

For example, the following rule may be defined:

```
A is true if {
    B is true; and
    C is true;
}
or {
    B is not true;
    D is true; and
    E is true;
}
```

The above rule may also be written as $$A=(B \wedge C) \vee (\neg B \wedge D \wedge E)$$

Figure 7A:
FIG. 7A illustrates an input screen for receiving a set of input values in accordance with some embodiments.

In response to receiving the above rule, runtime environment 112 may generate an interface to collect unknown attribute value for the goal attribute A. For example, FIG. 7A illustrates input screen 700 for receiving a set of input values for unknown attributes in accordance with some embodiments. Input screen 700 includes prompts for the values B, C, D, and E. Input screen 700 may be generated as a function of the input rule based on backward chaining without the need to provide an interface design.

One approach for a backward-chaining rule engine to collect inputs is to define the user interface controls as visible if they are relevant. A control may be classified as relevant if its value may still contribute to the final value of the goal attribute. For example, if B is false in the above rule, then C is not relevant because its value does not influence the goal's value no matter what the value of C is. The reason is the clause B and C can never be true when B is set to false.

When using relevance to show or hide elements of the interview without linearization, the application behavior and final data set may be vastly different depending on the order in which the user sets the values. The user may set the values in the following order:

TABLE 3

Example relevance calculations based on defined rule and sequential input

| | Set Value | Then |
|---|---|---|
| 1 | B: True | D and E are hidden as no longer relevant |
| 2 | C: True | A is inferred to true |
| Final Data Set | | A: True |
| | | B: True |
| | | C: True |
| | | D: <empty> |

Figure 7B:
FIG. 7B illustrates the state of the input screen based on selected input values in accordance with some embodiments.

In the case illustrated in Table 3, the interview behavior is unsurprising and produces the same result as the application of the linearization process depicted in FIG. 4. FIG. 7B illustrates the state of input screen 702 based on selected input values. As can be seen, input screen 702 disables and hides the interface controls for D and E when B is set to true. With C set to true, the rules engine may infer that the goal attribute A is true.

However, the order in which the values are set may produce different results to the final interview state, even if the result A remains the same. For example, the user may set values in the following order:

TABLE 4

Example relevance calculations based on defined rule and out-of-order input

| | Set Value | Then |
|---|---|---|
| 1 | D: True | No state change |
| 2 | E: False | D is hidden as no longer relevant |
| 3 | B: True | No state change |
| 4 | C: True | E is hidden as no longer relevant. A is inferred to true |
| Final Data Set | | A: True |
| | | B: True |
| | | C: True |
| | | D: True |

In this case, the final screen state appears the same as in the previous example, with D and E hidden. However, the final data set contains extra values for D and E even though neither contributes to the value of A. In addition, setting the value of E at the second step causes D, a control that had a value and appears before it on the screen, to be hidden.

Figures 7C, 7D, 7E:
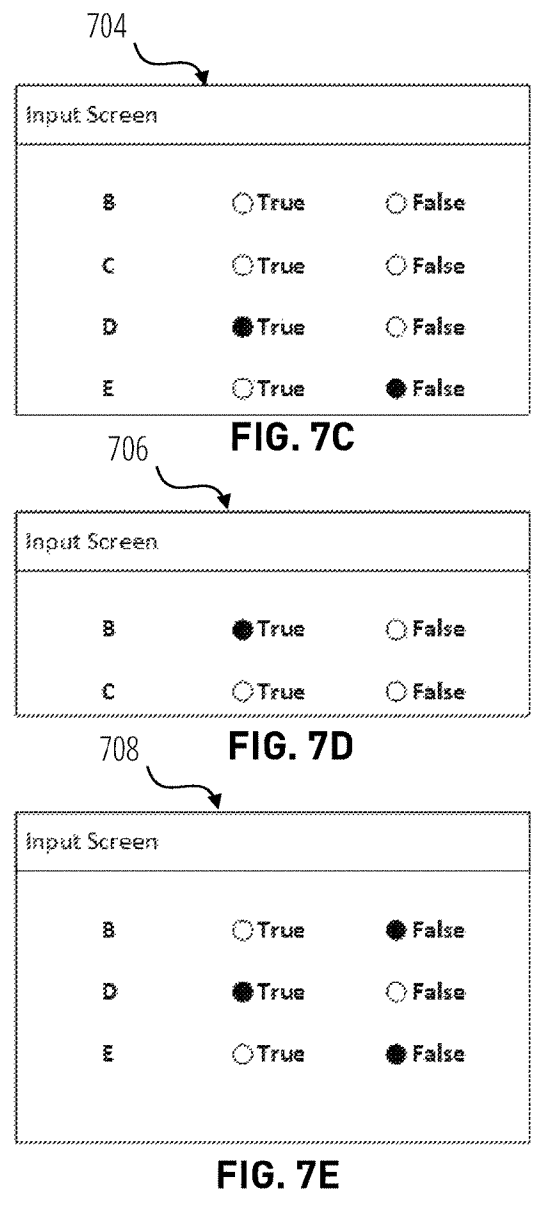

FIG. 7C illustrates an out-of-order selection of input values through the input screen in accordance with some embodiments. As displayed by input screen 706, the user has set D to true and E to false. If only relevance was taken into account, then D would be hidden as previously mentioned. However, with linearization, D is not hidden since E occurs after D in the linear sequence.

FIG. 7D illustrates a change in the input screen that hides previously selected input values based on newly provided answers to preceding input controls in accordance with some embodiments. As displayed by input screen 706, the user has set B to true, which hides the controls and selected values for D and E since these values are no longer relevant and occur subsequent to B in the linear sequence. The values previously set for D and E may be maintained in the answer set but are no longer are part of the material information.

FIG. 7E illustrates a change in the input screen that restores the previously selected input values based on a change in a previously provided answer in accordance with some embodiments. In this example, the user has changed the input value of B from true to false, as displayed by input screen 708. As a result, the controls and previously selected values for D and E are displayed again. These values may again be added to the material information dataset even though the values were not removed from the answer dataset since the values are again might be material to A depending on what value the user selects for C.

The application of the linearization process may proceed as follows:

TABLE 5

Example application of linearization process with out-of-order inputs

| | User Enters Value... | Answer set | Item State | Calculation Set |
|---|---|---|---|---|
| 0 | <initial state> | <empty> | B: Visible | <empty> |
| | | | C: Visible | <empty> |
| | | | D: Visible | <empty> |
| | | | E: Visible | <empty> |
| 1 | D: True | D: True | B: Visible | <empty> |
| | | | C: Visible | <empty> |
| | | | D: Visible | <empty> |
| | | | E: Visible | D: True |
| 2 | E: False | D: True | B: Visible | <empty> |
| | | E: False | C: Visible | <empty> |
| | | | D: Visible | <empty> |
| | | | E: Visible | D: True |
| 3 | B: True | D: True | B: Visible | <empty> |
| | | E: False | C: Visible | B: True |
| | | B: True | D: Hidden | B: True |
| | | | E: Hidden | B: True |
| 3 | C: True | D: True | B: Visible | <empty> |
| | | E: False | C: Visible | B: True |
| | | B: True | D: Hidden | B: True |
| | | C: True | | C: True |
| | | | E: Hidden | B: True |
| | | | | C: True |
| | Material data set: | | A: True | |
| | | | B: True | |
| | | | C: True | |

As can be seen, the set of actions produces a consistent result regardless of which order the values are set.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
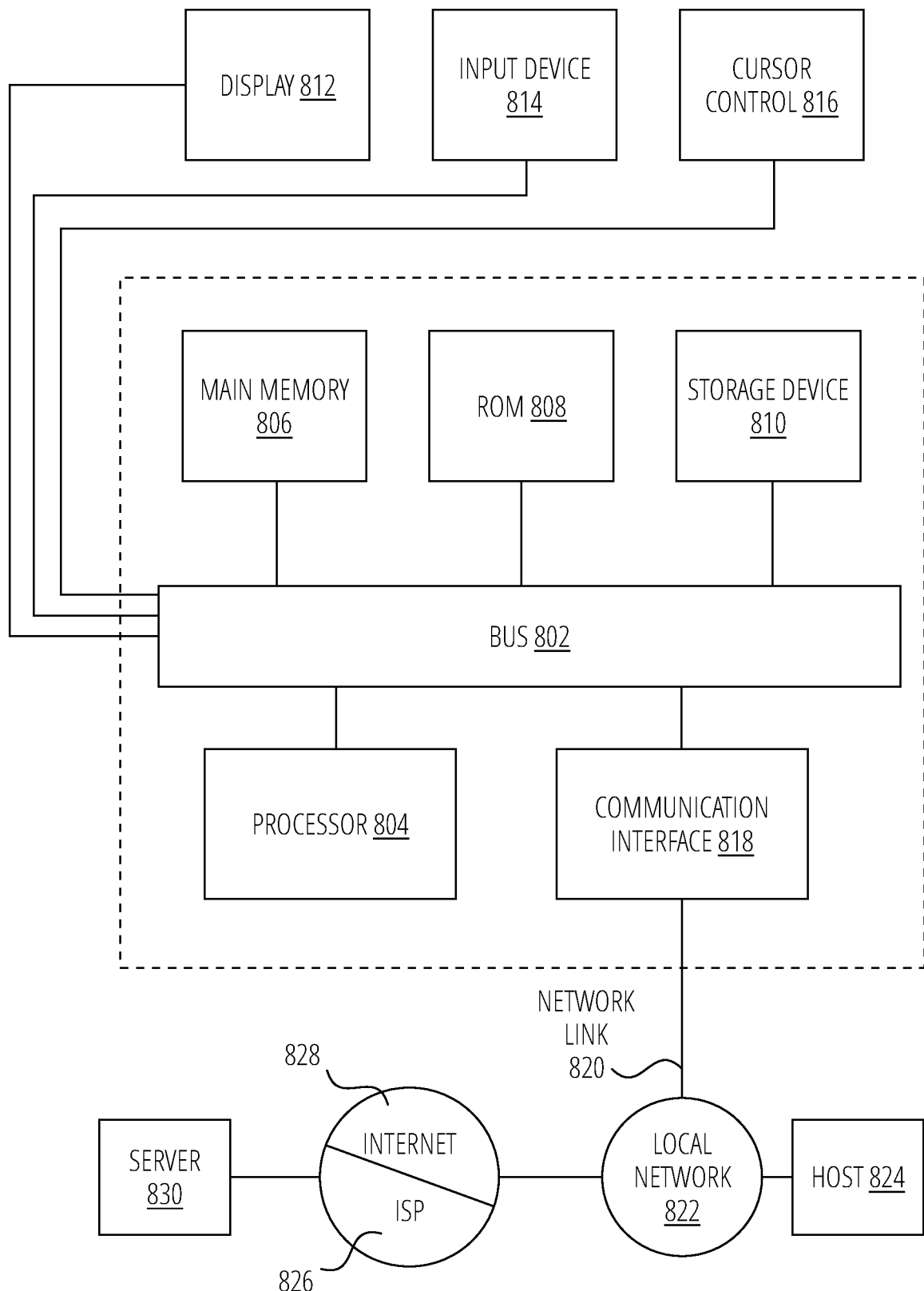
FIG. 8 shows a block diagram that illustrates a computer system in accordance with some embodiments.

For example, FIG. 8 is a block diagram that illustrates computer system 800 upon which an embodiment of the invention may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to some embodiments, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

9. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable medium storing instructions which, when executed by one or more hardware processors cause:
    defining a sequence of user interface elements, wherein at least a subset of user interface elements in the sequence of user interface elements correspond to controls for affecting a session state;
    receiving an input value through a user interface element in the subset of user interface elements;
    responsive to receiving the input value, adding the input value to at least a first dataset and a second dataset, wherein the second dataset includes at least one value previously input during the session that is not currently included in the first dataset;
    detecting a change, associated with the user interface element, from a current value to a previously submitted value;
    responsive to detecting the change from a current value to a previously submitted value, repopulating the first dataset with the at least one value from the second dataset to restore the at least one value to the first dataset;
    evaluating a current state for each respective user interface element subsequent to the user interface element in the sequence of user interface elements based on values within the first dataset; and
    disabling at least one user interface element in the subset of user interface elements based on said evaluating.

2. The non-transitory computer-readable media of claim 1, wherein the instructions further cause: detecting a change in a control state associated with the session based on the at least one value after the at least one value has been restored to the first dataset.

3. The non-transitory computer-readable medium of claim 1, wherein disabling the at least one user interface element comprises hiding the at least one user interface element such that the at least one user interface element is not visible to a user via a graphical user interface.

4. The non-transitory computer-readable medium of claim 1, wherein disabling the at least one user interface element comprises changing a state of the at least one user interface element to a read-only state such that new input values are prevented from being submitted by a user through the at least one user interface element.

5. The non-transitory computer-readable medium of claim 1, wherein the instructions further cause: identifying, based on the first dataset, a subset of input values received through the sequence of user interface elements that are material to the session state; and committing the subset of input values to a database; wherein at least one input value received through the sequence of user interface elements that is included in the second dataset is not committed to the database.

6. The non-transitory computer-readable medium of claim 1, wherein the instructions further cause: detecting a change to the input value that causes a change in the session state; responsive to detecting the change to the input value that causes the change in the session state, updating the first dataset to include a subset of one or more values from the second dataset that were not included in the first dataset immediately prior to the change in the session state.

7. The non-transitory computer-readable medium of claim 1, wherein the instructions further cause: performing a function at a conclusion of the session based on values included in the first dataset; wherein the function is not affected by the at least one input value in the second dataset that does not affect the session state and that is not included in the first dataset for evaluating the current state for each respective user interface element.

8. The non-transitory computer-readable medium of claim 1, wherein the instructions further cause: detecting a change to the input value that causes a change in the session state; responsive to detecting the change to the input value that causes the change in the session state: updating the input value in the first dataset for evaluating a current state for each respective user interface element subsequent to the user interface element in the sequence of user interface elements; and re-evaluating the current state for each respective user interface element subsequent to the user interface element in the sequence of user interface elements.

9. The non-transitory computer-readable medium of claim 8, wherein responsive to said re-evaluating, at least one user interface element that was previously disabled is enabled.

10. The non-transitory computer-readable medium of claim 8, wherein responsive to said re-evaluating, at least one user interface element that was previously enabled is disabled; wherein input values received through user interface elements that were previously enabled are maintained until a session is complete.

11. The non-transitory computer-readable media of claim 1, wherein the instructions further cause refraining from persistently storing input values received from user interface elements that have been disabled.

12. The non-transitory computer-readable media of claim 1, wherein the current state for each respective user interface element prior to the user interface element in the sequence of user interface elements is not affected by the user input value.

13. The non-transitory computer-readable media of claim 12, wherein the instructions further cause: detecting that at least one rule includes a dependency that conflicts with the sequence of user interface elements; and triggering an alert responsive to detecting the dependency that conflicts with the sequence of user interface elements.

14. The non-transitory computer-readable media of claim 1, wherein the input value is part of a set of input values submitted through a subset of the sequence of user interface elements; wherein the set of input values are submitted out-of-order from the sequence of user interface elements that has been defined.

15. The non-transitory computer-readable media of claim 1, wherein the instructions further cause: defining, for at least one interface element in the sequence of interface elements, at least one rule that controls when the at least one interface element is enabled and when the at least one user interface element is disabled.

16. The non-transitory computer-readable media of claim 1, wherein the instructions further cause: determining an order for the sequence of user interface elements based on at least one rule.

17. A system comprising:
one or more hardware processors;
one or more non-transitory computer-readable media storing instructions which, when executed by the one or more hardware processors, cause the system to perform operations comprising:
defining a sequence of user interface elements, wherein at least a subset of user interface elements in the sequence of user interface elements correspond to controls for affecting a session state;
receiving an input value through a user interface element in the subset of user interface elements;
responsive to receiving the input value, adding the input value to at least a first dataset and a second dataset that stores input values entered during a session, wherein the second dataset includes at least one value previously input during the session that is not currently included in the first dataset;
detecting a change, associated with the user interface element, from a current value to a previously submitted value;
responsive to detecting the change from a current value to a previously submitted value, repopulating the first dataset with at least one value from the second dataset to restore the at least one value to the first dataset;
evaluating a current state for each respective user interface element subsequent to the user interface element in the sequence of user interface elements based on values within the first dataset; and
disabling at least one user interface element in the subset of user interface elements based on said evaluating.

18. A method comprising:
defining a sequence of user interface elements, wherein at least a subset of user interface elements in the sequence of user interface elements correspond to controls for affecting a session state;
receiving an input value through a user interface element in the subset of user interface elements;
responsive to receiving the input value, adding the input value to at least a first dataset and a second dataset that stores input values entered during a session, wherein the second dataset includes at least one value previously input during the session that is not currently included in the first dataset;
detecting a change, associated with the user interface element, from a current value to a previously submitted value;
responsive to detecting the change from a current value to a previously submitted value, repopulating the first dataset with the at least one value from the second dataset to restore the at least one value to the first dataset;
evaluating a current state for each respective user interface element subsequent to the user interface element in the sequence of user interface elements based on values within the first dataset; and
disabling at least one user interface element in the subset of user interface elements based on said evaluating.

19. The method of claim 18, further comprising: detecting a change in a control state associated with the session based on the at least one value after the at least one value has been restored to the first dataset.

20. The method of claim 18, wherein disabling the at least one user interface element comprises hiding the at least one user interface element such that the at least one user interface element is not visible to a user via a graphical user interface.

* * * * *

UNITED STATES PATENT AND TRADEMARK OFFICE
CERTIFICATE OF CORRECTION

| | |
|---|---|
| PATENT NO. | : 11,847,472 B2 |
| APPLICATION NO. | : 17/839223 |
| DATED | : December 19, 2023 |
| INVENTOR(S) | : Van Der Vlist et al. |

It is certified that error appears in the above-identified patent and that said Letters Patent is hereby corrected as shown below:

In the Specification

In Column 17, Line 29, delete "emploved?:" and insert -- employed?: --, therefor.

In the Claims

In Column 26, Line 33, in Claim 2, delete "media" and insert -- medium --, therefor.

In Column 27, Line 27, in Claim 11, delete "media" and insert -- medium --, therefor.

In Column 27, Line 31, in Claim 12, delete "media" and insert -- medium --, therefor.

In Column 26, Line 36, in Claim 13, delete "media" and insert -- medium --, therefor.

In Column 27, Line 42, in Claim 14, delete "media" and insert -- medium --, therefor.

In Column 27, Line 48, in Claim 15, delete "media" and insert -- medium --, therefor.

In Column 27, Line 54, in Claim 16, delete "media" and insert -- medium --, therefor.

Signed and Sealed this
Seventh Day of May, 2024

Katherine Kelly Vidal
*Director of the United States Patent and Trademark Office*